(12) United States Patent
Murrin

(10) Patent No.: US 9,660,677 B2
(45) Date of Patent: May 23, 2017

(54) IMPULSIVE NOISE REJECTION

(71) Applicant: Imagination Technologies Limited, Kings Langley (GB)

(72) Inventor: Paul Murrin, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/990,571

(22) Filed: Jan. 7, 2016

(65) Prior Publication Data
US 2016/0204810 A1 Jul. 14, 2016

(30) Foreign Application Priority Data
Jan. 9, 2015 (GB) .................................. 1500379.1

(51) Int. Cl.
| | |
|---|---|
| *H04B 1/10* | (2006.01) |
| *H04L 27/26* | (2006.01) |
| *H04B 17/20* | (2015.01) |
| *H04B 7/06* | (2006.01) |
| *H04L 5/00* | (2006.01) |
| *H04L 1/20* | (2006.01) |
| *H04L 25/02* | (2006.01) |
| *H04B 17/309* | (2015.01) |

(52) U.S. Cl.
CPC ............. *H04B 1/10* (2013.01); *H04B 7/0626* (2013.01); *H04B 17/20* (2015.01); *H04B 17/309* (2015.01); *H04L 1/206* (2013.01); *H04L 5/0007* (2013.01); *H04L 25/02* (2013.01); *H04L 27/2647* (2013.01)

(58) Field of Classification Search
CPC ........ H04B 1/10; H04B 17/20; H04B 7/0626; H04B 17/309; H04L 27/2647; H04L 5/0007; H04L 25/02; H04L 1/206
See application file for complete search history.

(56) References Cited

U.S. PATENT DOCUMENTS

| | | | | |
|---|---|---|---|---|
| 5,311,087 A | * | 5/1994 | Suganuma | H04B 1/10 |
| | | | | 327/551 |
| 2003/0099287 A1 | * | 5/2003 | Arambepola | H03G 3/345 |
| | | | | 375/227 |
| 2004/0057502 A1 | * | 3/2004 | Azenkot | H04L 1/0045 |
| | | | | 375/147 |

(Continued)

FOREIGN PATENT DOCUMENTS

| | | |
|---|---|---|
| EP | 2723030 A1 | 4/2014 |
| GB | 2469069 A | 10/2010 |

*Primary Examiner* — Kenneth Lam
(74) *Attorney, Agent, or Firm* — Vorys, Sater, Seymour and Pease LLP; Vincent M DeLuca

(57) ABSTRACT

A method of rejecting impulsive noise in an OFDM receiver is described. The impulsive noise is rejected using channel state information (CSI) and is performed in the frequency domain. A noise power estimate (furthermore referred to as a noise value) is measured for a single OFDM symbol and compared to a threshold value, which may be generated based on a short-term average of OFDM symbols not corrupted by impulsive noise or predicted based on a small number of previously measured OFDM symbols not corrupted by impulsive noise. If the noise estimate for the particular OFDM symbol exceeds the threshold value, the CSI for that symbol is derated (i.e. modified) to reduce the influence of the information from this symbol on the decoding process.

14 Claims, 9 Drawing Sheets

(56) References Cited

U.S. PATENT DOCUMENTS

| | | | |
|---|---|---|---|
| 2004/0066865 A1* | 4/2004 | Yousef | H04B 1/1027 375/346 |
| 2009/0097596 A1 | 4/2009 | Li et al. | |
| 2010/0246726 A1* | 9/2010 | Asjadi | H04L 27/265 375/340 |
| 2011/0228836 A1 | 9/2011 | Yang et al. | |
| 2014/0119420 A1* | 5/2014 | Hewavithana | H04L 27/38 375/227 |

* cited by examiner

IMPULSIVE NOISE REJECTION

BACKGROUND

FIG. 1 shows a schematic diagram 100 of elements from a BICM (Bit Interleaved Coding and Modulation) module within a receiver in a digital communications system such as a Digital Terrestrial Television (DTT) system. The demapper 102 receives cells 104 and uses noise variance estimates 106 in order to output soft information 108 (which may also be referred to as soft estimates), such as Log-Likelihood Ratios (LLRs). This soft information 108 is passed to the decoder 110. In some examples, soft information is fed back to the demapper from the decoder (as indicated by dotted arrow 112) and this is referred to as iterative demapping or iterative decoding. In such an implementation, the soft information 108 output from the demapper 102 may be referred to as 'extrinsic LLRs' and the soft information which is fed back to the demapper from the decoder may be referred to as 'a priori LLRs'.

The embodiments described below are not limited to implementations which solve any or all of the disadvantages of known orthogonal frequency division multiplexing (OFDM) receivers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of rejecting impulsive noise in an OFDM receiver is described. The impulsive noise is rejected using channel state information (CSI) and is performed in the frequency domain. A noise power estimate (furthermore referred to as a noise value) is measured for a single OFDM symbol and compared to a threshold value, which may be generated based on a short-term average of OFDM symbols not corrupted by impulsive noise or predicted based on a small number of previously measured OFDM symbols not corrupted by impulsive noise. If the noise estimate for the particular OFDM symbol exceeds the threshold value, the CSI for that symbol is derated (i.e. modified) to reduce the influence of the information from this symbol on the decoding process.

A first aspect provides a method of impulsive noise rejection in an OFDM receiver, the method comprising: measuring a noise value for a single OFDM symbol; comparing the measured noise value for the single OFDM symbol to a threshold value; and in response to the comparison indicating that the measured noise value exceeds the threshold value, modifying a channel state information value for the single OFDM symbol.

A second aspect provides an OFDM receiver comprising: a processor; and a memory arranged to store device-executable instructions which, when executed, cause the processor to: measure a noise value for a single OFDM symbol; compare the measured noise value for the single OFDM symbol to a threshold value; and in response to the comparison indicating that the measured noise value exceeds the threshold value, modify a channel state information value for the single OFDM symbol.

A third aspect provides a non-transitory computer readable storage medium having stored thereon computer readable instructions that, when executed at a computer system for generating a representation of a digital circuit from definitions of circuit elements and data defining rules for combining those circuit elements, cause the computer system to generate a processor configured to perform the method as described herein.

A fourth aspect provides a non-transitory computer readable storage medium having encoded thereon computer readable program code to configure a processor to perform the method as described herein.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
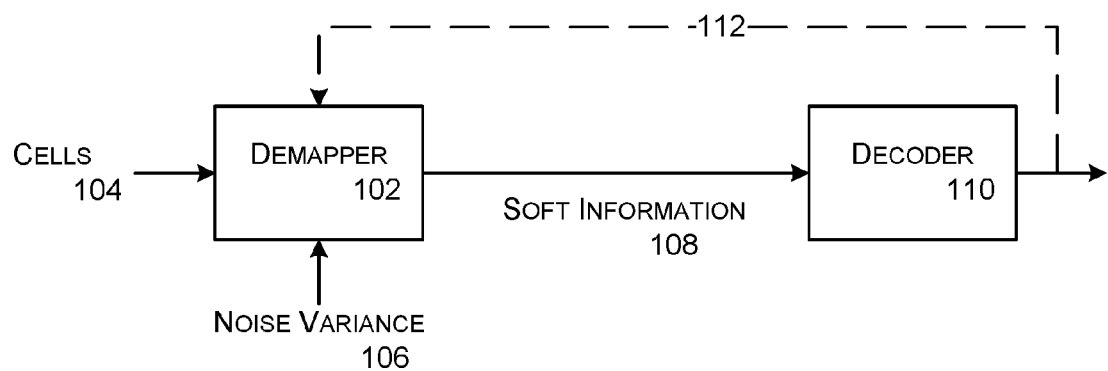
FIG. 1 is an example schematic diagram showing elements from a Bit Interleaved Coding and Modulation module within an OFDM receiver.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The term 'cell' is used herein to refer to a constellation symbol and 'cell' is used in the following description instead of constellation symbol to differentiate between constellation symbols and OFDM symbols. Any reference to 'symbol' in the following description relates to an OFDM symbol.

As shown in FIG. 1 and described above, the noise variance 106 or channel state information (CSI) is used within a demapper 102 to generate soft information 108 and this soft information 108 is then used by the decoder 110 to decode the input cells 104. Inaccuracies in the noise variance/CSI used by the demapper 102 (where the CSI may be the noise variance or a parameter which is related to the noise variance, such as the SNR which is inversely proportional to the noise variance) can result in inaccurate soft information which in turn can result in errors in the data output by the decoder 110. Inaccuracies can occur in the presence of impulsive noise due to the short-term nature of the impulsive noise. The effect of the impulsive noise is spread out due to longer term filtering of the individual noise samples required to produce a low-variance noise estimate.

Impulsive noise, which is short in duration but of high power, can cause errors in the demodulation of an OFDM signal. Impulsive noise is typically broadband and may, for example, be caused by the receiver (e.g. the aerial) picking up electrical disturbances caused by nearby switches being turned on or off. To mitigate this, an OFDM receiver may include an impulsive noise filter which operates in the time domain. Such a filter may operate by calculating a total power over a window of samples (e.g. 1, 2, 3 or 4 samples) and if the total power exceeds a threshold (where the threshold corresponds to the expected average total power), then the samples within that window are zeroed.

Such impulsive noise filters cannot, however, detect (and hence filter out) weak but frequent impulsive noise (i.e. multiple small impulses within the symbol) which can still cause significantly degraded demodulation in OFDM (e.g. as it disrupts the orthogonality).

Methods of rejecting impulsive noise via the CSI are described herein. The methods described operate in the frequency domain and involve running a short-term noise estimator or a noise predictor. An increase in the noise level within a single symbol is detected in the frequency domain and where detected, the CSI for that symbol only is adjusted accordingly (i.e. derated) to reduce the influence of the information within this symbol on the decoding process. The derated CSI is used in the demapper which as a result generates better soft information and this leads to more accurate data being output.

The term 'CSI' is often used to refer to the signal to noise ratio (SNR) per sub-carrier after equalization and in such examples, the CSI is adjusted (i.e. derated) by reducing the value. If, however, the term 'CSI' is used to refer to the noise variance per sub-carrier (where the SNR is proportional to 1/noise variance), then the CSI is adjusted (i.e. derated) by increasing the value. In either case, the adjusting of the CSI reduces the influence of the information within the particular symbol on the decoding process.

Figure 2:
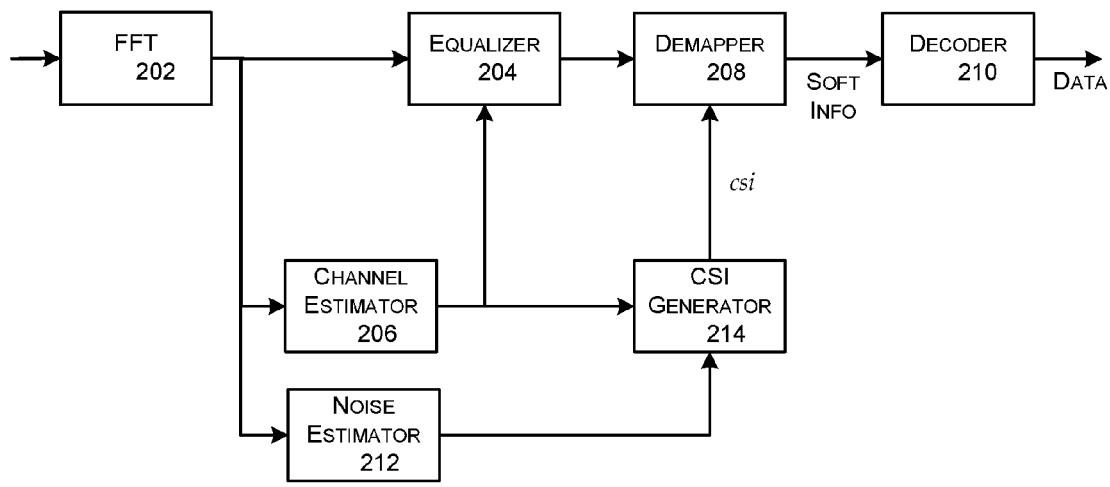
FIG. 2 is an example schematic diagram of elements within an OFDM receiver.

FIG. 2 is a schematic diagram of elements within an OFDM receiver, such as a DTT receiver (e.g. a DVB-T2 receiver). The receiver comprises a Fast Fourier Transform (FFT) module 202 which converts the input signal into the frequency domain. The output of the FFT module 202 is input to an Equalizer module 204, a Channel Estimator module 206 and a Noise Estimator module 212. The Channel Estimator module 206 generates an estimate of the channel which is input to both the Equalizer 204 and CSI generator 214 and the Noise Estimator 212 generates an estimate of the noise. The CSI Generator module 214 weights the noise (as received from the noise estimator 212) according to the channel estimator and implements the method of rejecting impulsive noise as described herein. The CSI Generator module 214 outputs a CSI value per sub-carrier (which, as described above, may be an SNR per sub-carrier or a noise variance per sub-carrier). A demapper 208 receives the CSI (e.g. a CSI value for each sub-carrier) and the output from the Equalizer 204 and generates soft information which is input to a decoder 210 (which performs error correction).

As described above, the methods of rejecting impulsive noise are implemented in the CSI generator module 214 in the frequency domain (i.e. after the FFT module 202). In contrast, a known impulsive noise filter (as described above) would be located prior to an FFT module in an OFDM receiver as it operates in the time domain.

Although FIG. 2 shows the channel estimator 206, noise estimator 212 and CSI generator 214 as separate modules, it will be appreciated that they may be combined into a single module which provides two outputs: the channel estimate to the equalizer 204 and CSI to the demapper 208.

Figure 3:
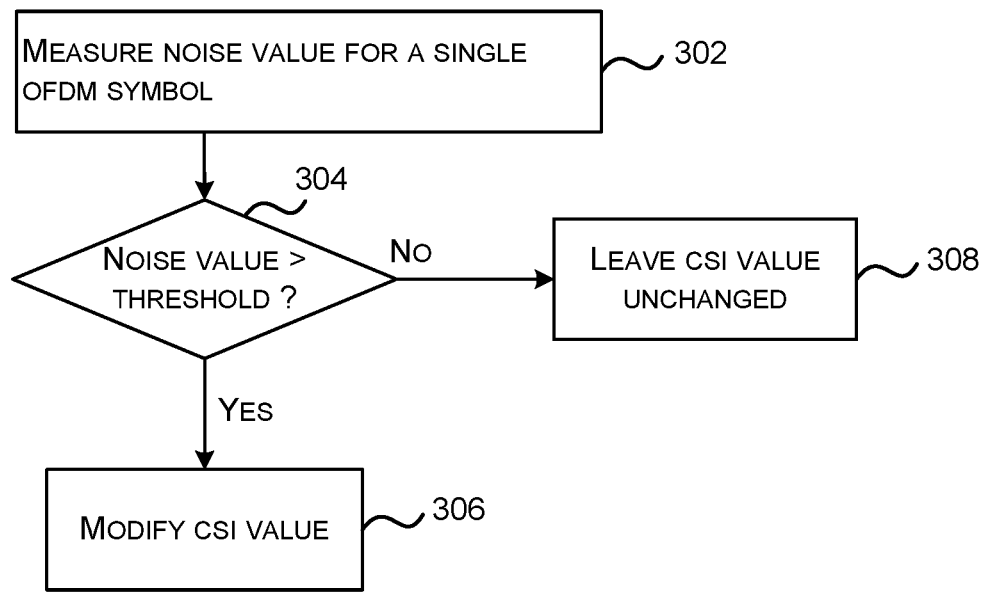
FIG. 3 is a flow diagram showing an example method of rejecting impulsive noise (and in particular weak but frequent impulsive noise) using CSI.

FIG. 3 is a flow diagram showing an example method of rejecting impulsive noise (and in particular weak but frequent impulsive noise) using CSI. As described above, this method may be implemented within the CSI Generator module 214. As shown in FIG. 3, the method (which operates in the frequency domain) comprises measuring a noise value for a single OFDM symbol (block 302). There are many different ways that this noise value may be generated including using continuous pilots and/or scattered pilots (where present) or the preamble of the OFDM symbol and various examples are described below with reference to FIGS. 4-7.

The measured noise value for a single OFDM symbol is then compared to a threshold value and as a result of the comparison the CSI value which has been generated by the CSI Generator module 214 may be derated (i.e. changed in value) or left unchanged. In the example shown in FIG. 3, if the noise value exceeds the threshold ('Yes' in block 304), the CSI value is modified (block 306) and if the noise value does not exceed the threshold ('No' in block 304), the CSI value is not modified (block 308). It will be appreciated, however, that the comparison may be performed in a different way, e.g. CSI modified if the noise value equals or exceeds the threshold and CSI not modified if the noise value is less than the threshold (and this is also the case for the equivalent method blocks in FIGS. 4-7).

The threshold which is used in the comparison (e.g. in block 304 and in equivalent method blocks in FIGS. 4-7) may be generated in a number of different ways. For example, the threshold may be calculated based on an expected noise value for a single OFDM symbol, e.g. it may be set to a value which is 10-20% above the expected noise value or a value which is significantly higher than the expected noise value. In various examples it may be set to a value which is proportional to the expected noise value, e.g. 5 times the expected noise value. In various examples, the threshold may selected to avoid false detection and so may be higher for systems with high co and adjacent channel interference (e.g. from analogue TV, such as for DVB-T/T2) than for systems which do not experience this (e.g. DVB-C). The expected noise value for a single OFDM symbol may be calculated based on a short-term average (i.e. an average over a few symbols, e.g. 8 OFDM symbols) or may be predicted based on previous noise values (e.g. by extrapolating from previous measured noise values). Where averaging is used to calculate the expected noise value, the averaging is not performed over a large number of samples (i.e. it is not long-term averaging) because otherwise false positives may be triggered (e.g. impulsive noise may be thought to be detected where it is not present) as a consequence of the radio channel changing over time (e.g. due to slow fading of the channel). A delay line may be used to implement the short-term averaging.

There are many ways in which the CSI may be modified (in block 306 and in equivalent method blocks in FIGS. 4-7) in order to reduce the influence of the data from the particular symbol in the decoding process. In various examples, the CSI may be derated based on a ratio of the noise value on the particular symbol to the expected noise value, or a ratio of the noise value on the particular symbol to the threshold. In this way, the modification to the CSI is not by a fixed amount or to a fixed value, but is instead dependent upon the actual noise value for the symbol. However, in other examples, the modification of the CSI may be by a fixed amount or to a fixed non-zero value. By modifying the CSI in this way, the particular symbol is not discarded totally, but instead its influence on the decoding process is reduced (e.g. by increasing the uncertainty associated with the values obtained from the symbol). In other examples, however, the symbol may be discarded totally and instead the error correction within the decoder 210 may be relied upon to recover the lost information.

As described above, if the term 'CSI' is often used to refer to the signal to noise ratio (SNR) per sub-carrier after equalization and then CSI is modified (in block 306 or the equivalent method blocks in FIGS. 4-7) by reducing the value. If, however, the term 'CSI' is used to refer to the noise variance per sub-carrier (where the SNR is proportional to 1/noise variance), then the CSI is modified (in block 306 or the equivalent method blocks in FIGS. 4-7) by increasing the value. In either case, the adjusting of the CSI reduces the influence of the information within the particular symbol on the decoding process.

Figure 4:
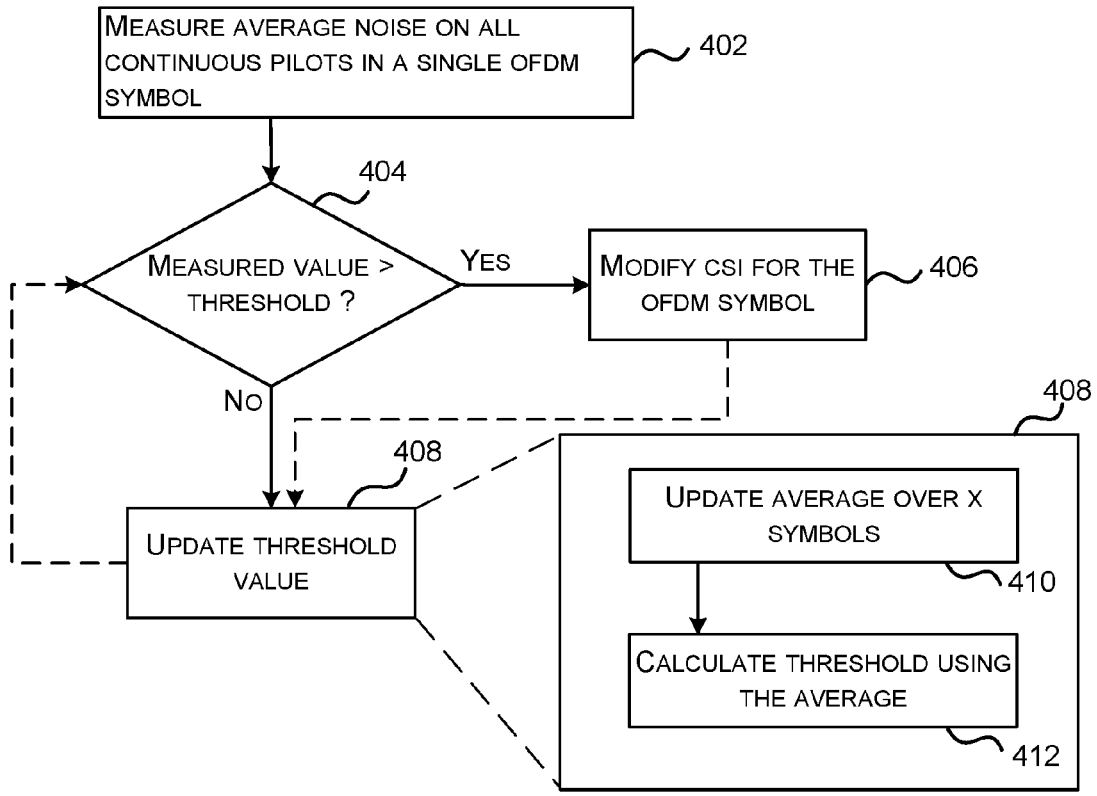
FIG. 4 shows a variation on the method shown in FIG. 3 where continuous pilots are used to measure the noise within an OFDM symbol.

FIG. 4 shows a variation on the method shown in FIG. 3 where continuous pilots are used to measure the noise value of an OFDM symbol and where the threshold is calculated using an average of measured noise values over a small number of symbols (e.g. 8 symbols). As shown in FIG. 4, the average noise on all continuous pilots in a single OFDM symbol is measured (block 402) and this measured average noise is used as the noise value for the symbol. Continuous pilots are used where these are available as they provide an accurate non-time variant estimate of the noise power. The measured value (from block 402) may be considered to be an instantaneous noise value (despite the use of averaging over all continuous pilots) because it relates to a single OFDM symbol. The measured value (from block 402) is then compared to a threshold value (in block 404) which is generated using a short-term average noise value (e.g. an average of instantaneous values from 8 symbols). If the threshold is exceeded ('Yes' in block 404), the CSI for the particular OFDM symbol is modified (block 406), e.g. as described above. If however, the threshold is not exceeded ('No' in block 404), the CSI value for the symbol is not changed, but the measured value (from block 402) is used to update the threshold value (block 408) and the updated threshold value is then used in a next comparison step (e.g. in block 404 for the next symbol).

As described above, the threshold value which is used (in block 404) may be calculated using a short-term average noise, i.e. an average of the measured (instantaneous) noise values (as measured in block 402) from a small number of symbols (e.g. 8 symbols). For example, the threshold may be set to be 10-20% above the average of the measured noise values. Those symbols which are identified as suffering from impulsive noise (based on the comparison performed in block 404, i.e. where the threshold value is exceeded) are not included in the short-term average as they would corrupt the average value. As a result, and as shown in FIG. 4, only where the threshold is not exceeded ('No' in block 404) is the measured value (from block 402) used to update the short-term average (in block 410) and hence to update the threshold (in block 412). In various examples, a delay line may be used to generate the short-term average with measured values (from block 402) only being put into the delay line if the value does not exceed the threshold value.

Figure 5:
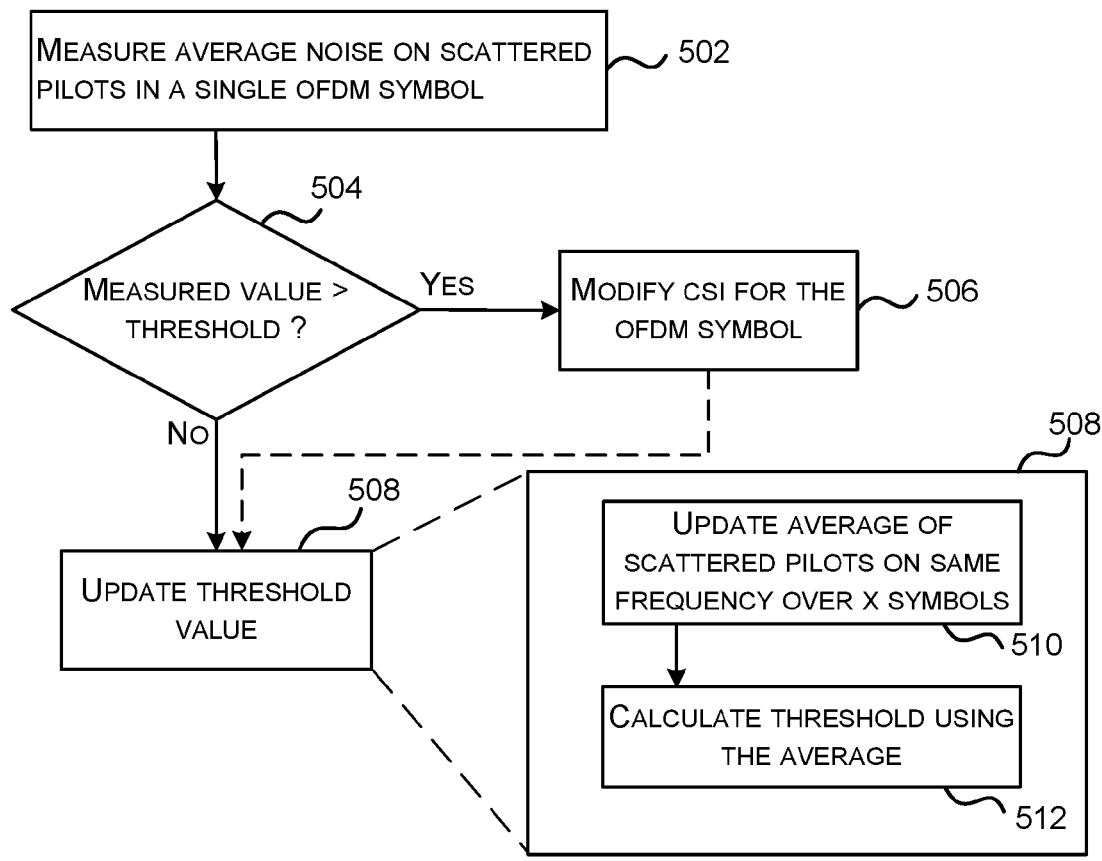
FIG. 5 shows another variation on the method shown in FIG. 3 where scattered pilots are used to measure the noise within an OFDM symbol.

FIG. 5 shows another variation on the method shown in FIG. 3 where scattered pilots are used to measure the noise value of an OFDM symbol and where, like in FIG. 4, the threshold is calculated using an average of measured noise values over a small number of symbols (e.g. 8 symbols). Whilst there may be many more scattered pilots in a symbol than continuous pilots, the scattered pilots are on different frequencies in different symbols and these different frequencies may experience different channel conditions (e.g. different multi-path interference). Consequently, the method may maintain multiple thresholds (one for each scattered pilot frequency or position). A single threshold may alternatively be used (i.e. the same value for all frequencies or positions of scattered pilots), but this would result in some performance loss for some channels. As shown in FIG. 5, the average noise on the scattered pilots in a single OFDM symbol is measured (block 502) and this average noise is used as the noise value for the symbol. The measured average noise is then compared against the appropriate threshold (block 504), e.g. against the threshold calculated using previous measured values for scattered pilots of the same frequency/phase. If the measured value exceeds the threshold ('Yes' in block 504), the CSI for the particular OFDM symbol is modified (block 506), i.e. derated, but if the threshold is not exceeded ('No' in block 504), the measured value is used to update the threshold value (block 508).

As shown in FIG. 5, the threshold which is updated (in block 508) depends on the frequency/phase of the scattered pilots in the particular OFDM symbol. Where a symbol is not found to be suffering from impulsive noise, the measured average noise on the symbol may be used to update the average noise of scattered pilots on the same frequency/phase (block 510). Again a short term average (e.g. over X samples) may be used. The value of X which is used with scattered pilots (in FIG. 5) may be smaller than that used with continuous pilots (in FIG. 4) because where scattered pilots are used the average is calculated using only a subset of symbols (i.e. those of the same frequency/phase). If the same value of X was used in both cases, the average in the scattered pilot case would be calculated over a much longer time period and hence may be more prone to false triggers as the channel itself changes (e.g. due to channel fading). For example, an average in the scattered pilot case (as updated in block 510) may use only every $4^{th}$ symbol and so if X=8, it would create an average from the measured values (assuming none of them were affected by impulsive noise) from symbols 0, 7, 15, 23, 31, 39, 47, 55 compared to symbols 0,1,2,3,4,5,6,7 for the continuous pilot case (assuming that none were affected by impulsive noise).

Figure 6:
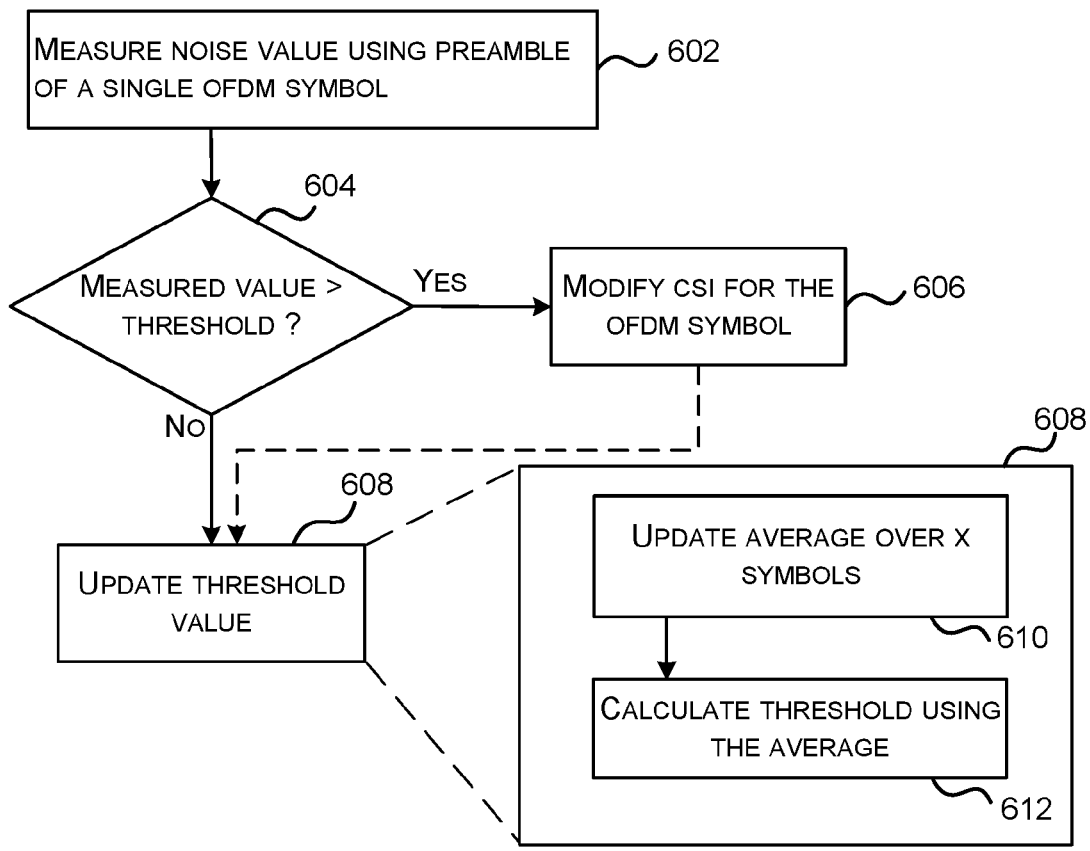
FIG. 6 shows another variation of the method shown in FIG. 3 where the preamble of the OFDM symbol is used to measure the noise within an OFDM symbol.

FIG. 6 shows another variation on the method shown in FIG. 3 where the preamble of the OFDM symbol is used instead of the scattered/continuous pilots. This may, for example, be used for pilotless OFDM, although it may also be used where pilots are present. In this example, a noise value is measured using the preamble of a single OFDM symbol (block 602). As in FIGS. 3-5, this noise value is then compared to a threshold (block 604) and depending upon whether it exceeds the threshold or not, the CSI for the particular symbol may be modified ('Yes' in block 604 followed by block 606). Where the noise value does not exceed the threshold value ('No' in block 604), the noise value may be used to update an average noise value over X symbols (block 610), where the value of X may be the same or different from that used in FIGS. 4 and 5. The threshold may then be calculated based on the updated average (block 612).

Figure 7:
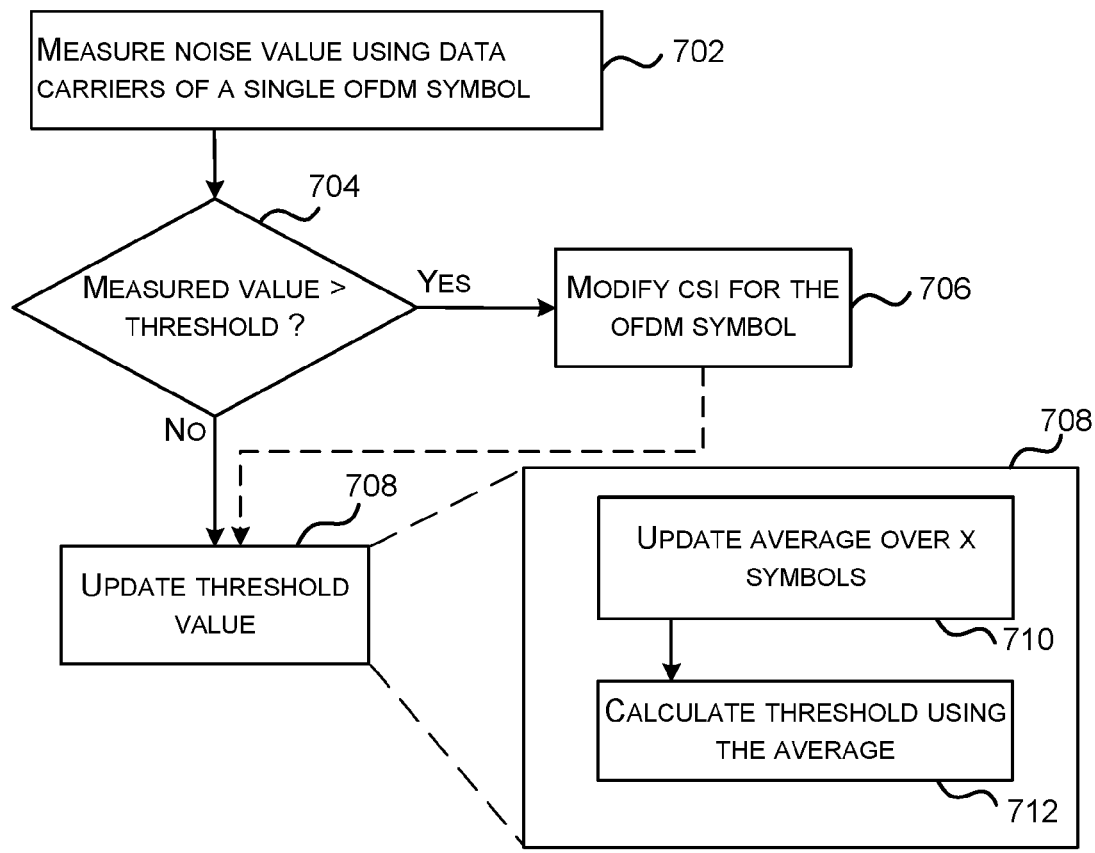
FIG. 7 shows another variation on the method shown in FIG. 3 where the data carriers of the OFDM symbol are used to measure the noise within an OFDM symbol.

FIG. 7 shows a further variation on the method shown in FIG. 3 where the data carriers of the OFDM symbol are used instead of the scattered/continuous pilots. This may, for example, be used for pilotless OFDM, although it may also be used where pilots are present. In this example, the noise for each sub-carrier is measured using a decision directed approach (in block 702) which may, for example, involve selecting a closest constellation point to the received symbol and then measuring (or calculating) the noise value (e.g. based on a distance between the received symbol and the closest constellation point). As in FIGS. 3-6, this noise value is then compared to a threshold (block 704) and depending upon whether it exceeds the threshold or not, the CSI for the particular symbol may be modified ('Yes' in block 704 followed by block 706). Where the noise value does not exceed the threshold value ('No' in block 704), the noise value may be used to update an average noise value over X symbols (block 710), where the value of X may be the same or different from that used in FIGS. 4-6. The threshold may then be calculated based on the updated average (block 712).

It will be appreciated that in further examples, the noise value (for an OFDM symbol) may be measured (in block 302) using any combination of the methods described above with reference to FIGS. 4-7, e.g. using a combination of any two or more of: continuous pilots, scattered pilots, the preamble and the data carriers within the OFDM symbol.

Figure 8:
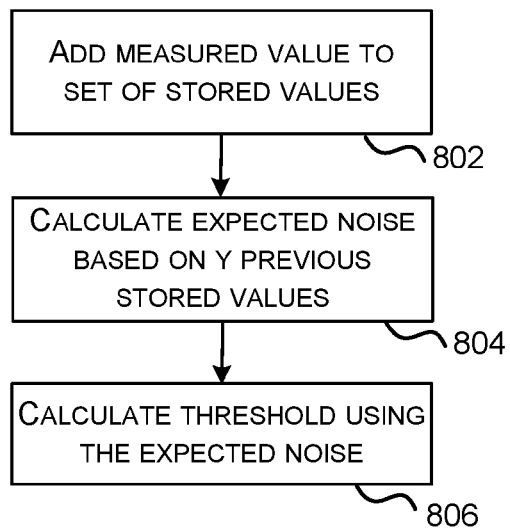
FIG. 8 is a flow diagram of a method of updating the threshold using predictions.

In a variation on the methods shown in FIGS. 4-7, the threshold value may be calculated using a predicted noise value (or predicted average noise) rather than being calculated using a short-term average as described above. In such a variation, the threshold may be updated (in blocks 408, 508, 608, 708) using the method shown in FIG. 8. In this example, where a symbol is not identified as suffering from impulsive noise (e.g. the threshold is not exceeded), the measured value is added to a store of measured values (block 802) and then a number, Y, of these stored values (e.g. the last Y values or the last Y values for pilots with the same frequency/phase) are used to calculate the expected noise value for the next symbol (block 804) i.e. to predict a noise value for the next symbol, e.g. by fitting a line or curve to the Y values. The threshold is then calculated based on this predicted value (block 806), e.g. the threshold may be set to 10-20% above the predicted value or 5 times the predicted value.

Although in the examples above the threshold is described as being set to 10-20% above a short-term average or a predicted value or to 5 times the short-term average or the predicted value, in other examples the threshold may be set closer to, further from or equal to the short-term average or predicted value or may be set using other criteria.

Although FIGS. 4-8 show use of a threshold which is regularly updated (e.g. each time the threshold is not exceeded in blocks 404, 504, 604, 704), it will be appreciated that in other examples, a fixed threshold may be used (e.g. blocks 408, 508, 608, 708 may be omitted) or the threshold may be updated less frequently or using other criteria. In various examples, the threshold may also be updated when the CSI is modified (e.g. as indicated by the dotted line from block 406 to block 408 in FIG. 4 and equivalent blocks in FIGS. 5-7).

The methods described above with reference to FIGS. 3-8 may be implemented in software (as described below with reference to FIG. 9) or alternatively they may be implemented in dedicated hardware logic.

Figure 9:
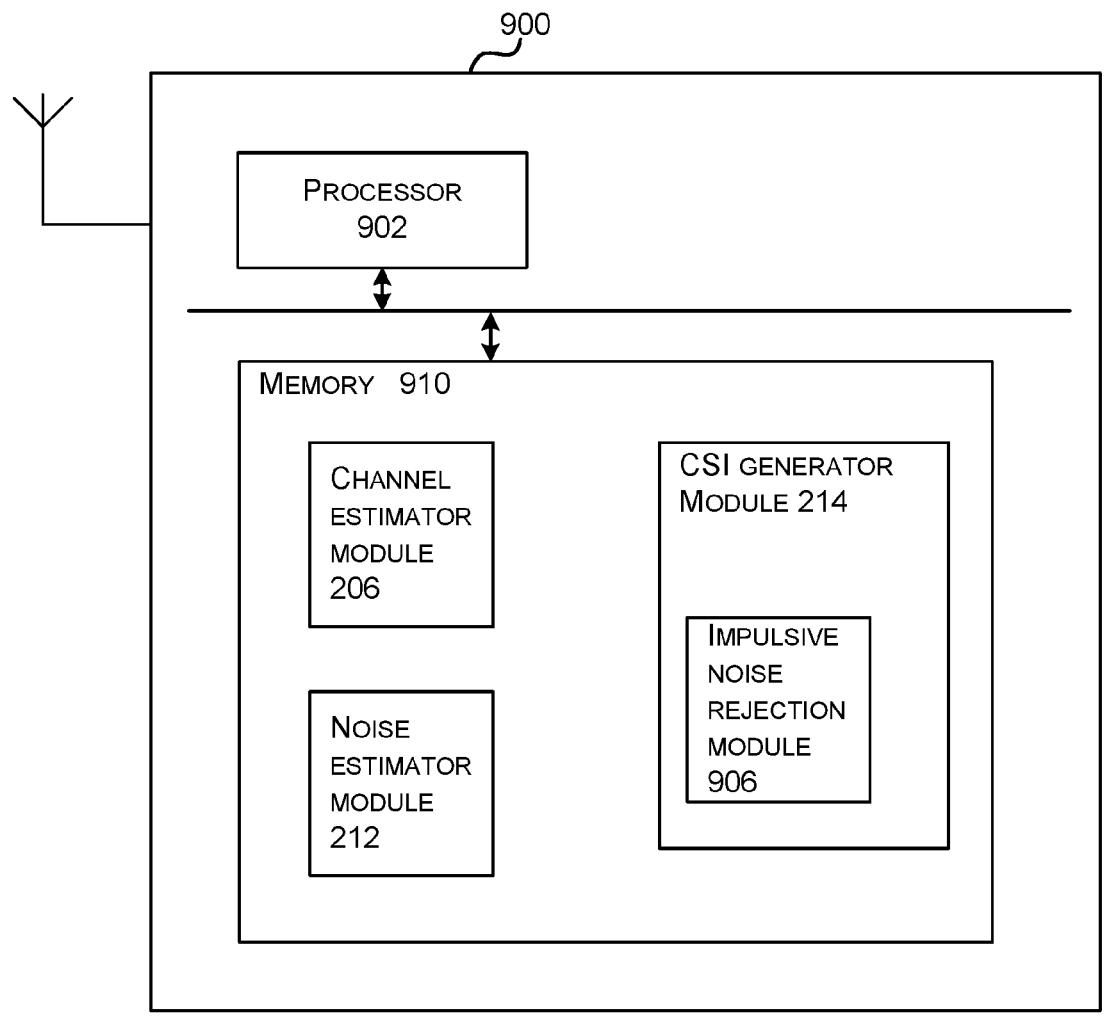
FIG. 9 illustrates various components of an exemplary OFDM receiver.

FIG. 9 illustrates various components of an exemplary OFDM receiver 900 which may be implemented as any form of a computing and/or electronic device, and in which the methods described herein may be implemented.

As shown in FIG. 9, the channel estimation and in particular the modification of the CSI to reject impulsive noise (as described herein) may be performed in software which is executed by a processor 902 within the receiver 900. The processor 902 may be a microprocessor, controller or any other suitable type of processor for processing computer executable instructions to control the operation of the device in order to perform the impulsive noise rejection methods as described herein. In some examples, for example where a system on a chip architecture is used, the processor 900 may include one or more fixed function blocks (also referred to as accelerators) which implement a part of, or all of, the method of performing impulsive noise rejection in hardware (rather than software or firmware).

The computer executable instructions which are executed by the processor in order to perform the channel estimation (e.g. in channel estimator module 206), noise estimation (e.g. in noise estimator module 212) and CSI generation (e.g. in CSI generator module 214) may be provided using any computer-readable media that is accessible by the receiver 900. As shown in FIG. 9, the CSI generator module 214 may comprise an impulsive noise rejection module 906 which is configured to implement the methods described herein (e.g. as shown in FIGS. 3-8).

Computer-readable media may include, for example, computer storage media such as memory 910 and communications media. Computer storage media (i.e. non-transitory machine readable media), such as memory 910, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 910) is shown within the receiver 900 it will be appreciated that the storage may be distributed or located remotely and accessed via a network or other communication link.

The methods described herein may be used in any OFDM receiver, such as a DTT receiver (e.g. a DVB-T2 receiver or a DVB-T receiver) or Wi-Fi™ receiver. By using methods of impulsive noise rejection using CSI as described herein (e.g. as shown in FIGS. 3-8) the OFDM demodulation is improved leading to fewer errors in the received data. In addition, or instead, use of the methods described herein may enable use of components which allow more impulsive noise into the receiver (e.g. a co-axial aerial lead with less screening) as the additional impulsive noise can be rejected using CSI (as described herein).

In DVBT2 the symbols are larger (e.g. than some other DTT standards) which limits the efficacy of the existing impulsive noise filters which operate in the time domain. For example, impulsive noise may be categorized as being in one of three categories:
  a) Sufficiently strong to be filtered by existing impulsive noise rejection filters that operate in the time domain,
  b) Weaker (and so not filtered by existing impulsive noise rejection filters) but frequent and which causes degradation in OFDM demodulation, and
  c) Sufficiently weak and/or infrequent that it does not cause any appreciable degradation in OFDM demodulation.

The methods described herein address impulsive noise in category (b) above and for a larger symbol (such as used in DVBT2) this middle ground increases and so the improvement in the OFDM demodulation performance which can be achieved using the methods described herein (e.g. as shown in FIGS. 3-8) increases.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The term 'subset' is used herein to refer to a proper subset, i.e. such that a subset does not include all the elements of the set.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of impulsive noise rejection in an OFDM receiver, the method comprising:
    measuring a noise value for a single OFDM symbol;
    comparing the measured noise value for the single OFDM symbol to a threshold value;
    in response to the comparison indicating that the measured noise value exceeds the threshold value, modifying a channel state information value for the single OFDM symbol to allow for a correct recovery of information represented by the OFDM signal; and
    in response to the comparison indicating that the measured value does not exceed the threshold value, updating the threshold value, said updating comprising updating a short-term average noise value using the measured value or calculating an expected noise value using the measured value.

2. A method according to claim 1, wherein updating the threshold value comprises:
    updating a short-term average noise value using the measured value; and
    calculating an updated threshold value using the updated short-term average noise value.

3. A method according to claim 1, wherein updating the threshold value comprises:
    calculating an expected noise value by extrapolating from a plurality of previously measured values; and
    calculating an updated threshold value using the expected noise value.

4. A method according to claim 3, wherein calculating an updated threshold value using the expected noise value comprises:
    setting the updated threshold value to a value which is proportional to the expected noise value.

5. A method according to claim 1, further comprising:
    in response to the comparison indicating that the measured value exceeds the threshold value, updating the threshold value.

6. A method according to claim 1, wherein modifying a channel state information value for the single OFDM symbol comprises:
    changing the channel state information value using a ratio of the measured noise value and at least one of: a short-term average noise value, an expected noise value and the threshold value.

7. A method according to claim 1, wherein measuring a noise value for a single OFDM symbol comprises:
    measuring a noise value using one or more of: continuous pilots, scattered pilots, a preamble and data carriers within the OFDM symbol.

8. A method according to claim 1, wherein measuring a noise value for a single OFDM symbol comprises:
    measuring an average noise on continuous pilots in the single OFDM symbol.

9. A method according to claim 1, wherein measuring a noise value for a single OFDM symbol comprises:
    measuring an average noise on scattered pilots in the single OFDM symbol, and wherein comparing the measured noise value for the single OFDM symbol to a threshold value comprises:
    comparing the average noise on scattered pilots in the single OFDM symbol to a threshold value for scattered pilots with the same pilot frequency.

10. A method according to claim 1, wherein measuring a noise value for a single OFDM symbol comprises:
    measuring a noise value using a preamble of the single OFDM symbol.

11. A method according to claim 1, wherein measuring a noise value for a single OFDM symbol comprises:
    measuring a noise value using data carriers of the single OFDM symbol.

12. A method according to claim 11, wherein measuring a noise value using data carriers of the single OFDM symbol comprises:
    selecting a closest constellation point to the received symbol; and
    calculating the noise value based on a distance between the received symbol and the selected closest constellation point.

13. An OFDM receiver comprising:
    a processor; and
    a memory arranged to store device-executable instructions which, when executed, cause the processor to:
    measure a noise value for a single OFDM symbol;
    compare the measured noise value for the single OFDM symbol to a threshold value;
    in response to the comparison indicating that the measured noise value exceeds the threshold value, modify a channel state information value for the single OFDM symbol to allow for a correct recovery of information represented by the OFDM signal; and
    in response to the comparison indicating that the measured value does not exceed the threshold value, updating the threshold value, said updating comprising updating a short-term average noise value using the measured value or calculating an expected noise value using the measured value.

14. A non-transitory computer readable storage medium having stored thereon computer readable instructions that, when executed at a computer system for generating a representation of a digital circuit from definitions of circuit elements and data defining rules for combining those circuit elements, cause the computer system to generate a processor configured to perform the method as set forth in claim 1.

* * * * *